Nov. 26, 1963
C. H. SILBEREIS ETAL
3,111,871
MACHINE TOOL
Filed Nov. 18, 1960
2 Sheets-Sheet 2
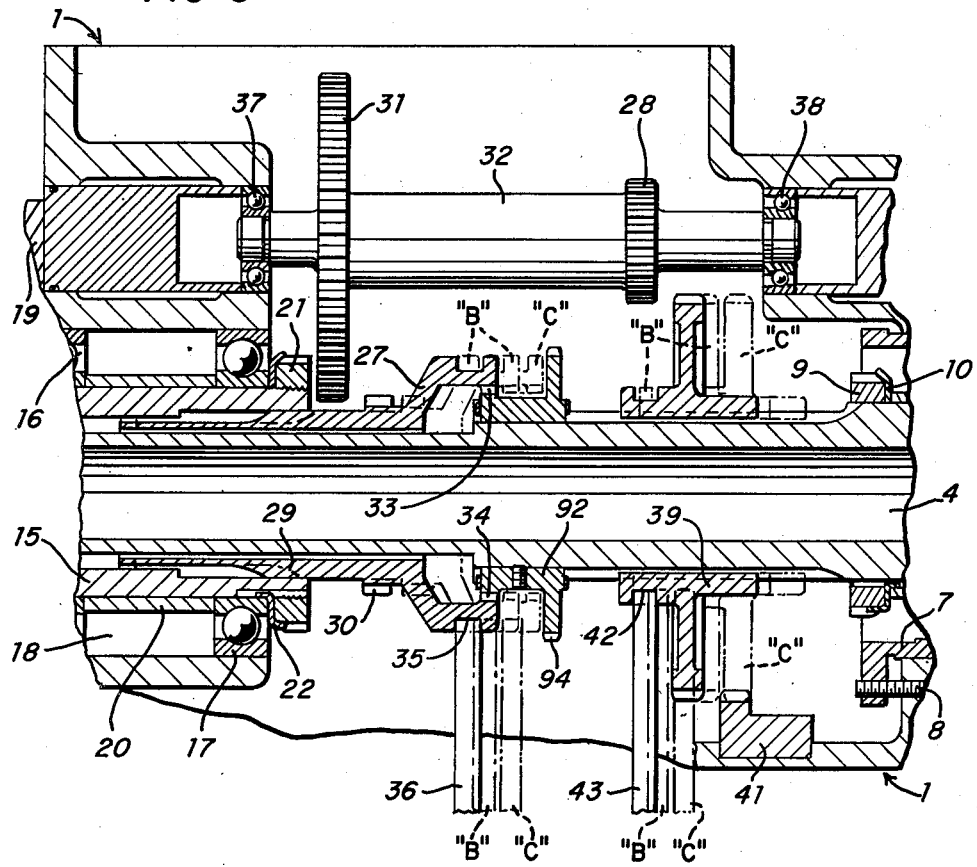
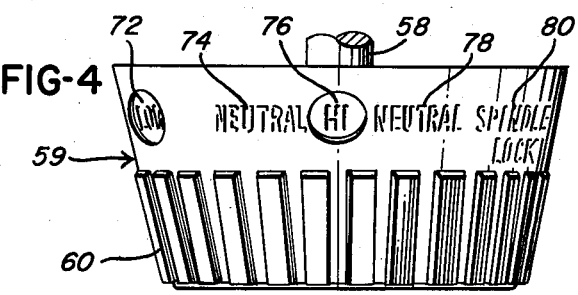
INVENTORS
CHARLES H. SILBEREIS
DONALD L. COY
BY
William R Jacox
ATTORNEY

United States Patent Office 3,111,871
Patented Nov. 26, 1963

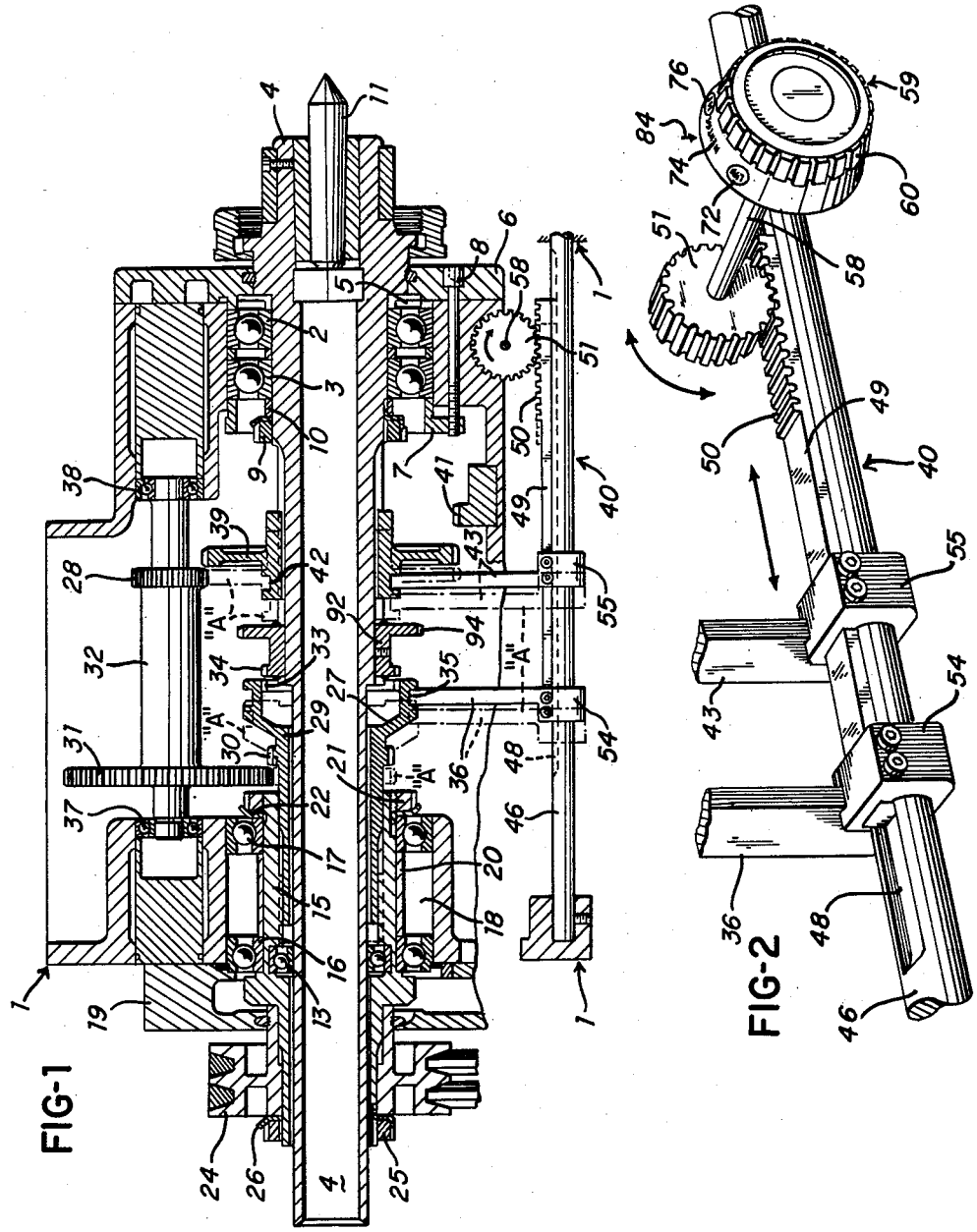

3,111,871
MACHINE TOOL
Charles H. Silbereis and Donald L. Coy, Dayton, Ohio, assignors, by mesne assignments, to Sommerfeld Machine Company, Inc., Braddock, Pa., a corporation of Pennsylvania
Filed Nov. 18, 1960, Ser. No. 70,308
9 Claims. (Cl. 82—29)

This invention relates to a machine tool. The invention relates more particularly to means for connecting a spindle of a lathe to driving or locking mechanism.

For maintainance of accurate centering of the spindle shaft of a lathe, the spindle shaft must have an adequate bearing support surface and yet have means to reduce to a minimum friction forces opposing rotation thereof. It is also neccessary that the driving force upon a spindle shaft does not create a bending moment thereupon to affect the concentricity of operation thereof.

Accordingly, it is an object of this invention to provide headstock structure in which driving means, either direct, or indirect, upon a spindle shaft does not affect concentricity of operation thereof.

It is an object of this invention to provide lathe apparatus having spindle operation and spindle lock mechanism and in which a single spindle control mechanism is used to provide spindle operating conditions and the spindle lock condition.

It is another object of this invention to provide mechanism by which a spindle lock position can be obtained only by first obtaining a neutral condition of the spindle.

It is a further object of this invention to provide spindle support means, driving means, and speed shifting mechanism which are coaxial and in which direct power transmission means for alternate speeds operates upon a parallel axis.

It is a further object of this invention to provide such mechanism in which there is a neutral position adjacent each gear position of the spindle.

Other objects and advantages reside in the construction of parts, the combination thereof, the method of manufacture, and the mode of operation, as will become more apparent from the following description.

In the drawings:

FIGURE 1 is a sectional view showing spindle drive apparatus of the machine tool of this invention.

FIGURE 2 is a fragmentary perspective and diagrammatic type of view showing a portion of the apparatus of this invention.

FIGURE 3 is a sectional view on a larger scale showing a portion of the apparatus of FIGURE 1 in other operating positions thereof.

FIGURE 4 is an enlarged fragmentary plan view showing a portion of the apparatus of FIGURE 2.

Referring to the drawings in detail, FIGURE 1 shows support structure or frame member 1 which provides means for supporting elements of a headstock structure. The frame 1, may be a large casting which provides a substantial means for supporting bearing assemblies 2 and 3 which are in rotatable supporting relation to a spindle 4. The bearing assemblies 2 and 3 are maintained within an opening 5 of the frame 1 by means of an end plate 6 which is secured to a bearing retainer 7 by a plurality of bolts 8. A lock nut 9 and a retainer 10, encompassing the spindle 4, aid in maintaining the position of the bearing assemblies 2 and 3. The spindle 4 carries a center piece 11.

The spindle 4, extending through the frame 1, is also rotatably supported by a bearing assembly 13. The bearing assembly 13 is disposed within a driving sleeve 15 which is supported by bearing assemblies 16 and 17. The bearing assemblies 16 and 17 are mounted within an opening 18 in the frame 1. A plate 19 is attached to the end of the frame 1 and retains the position of the bearing assembly 16 within the opening 18. A spacer 20 is positioned between the bearing assemblies 16 and 17. A lock nut 21 threadedly engages the driving sleeve 15 and urges a retainer 22 into engagement with the bearing 17.

The driving means for the spindle shaft 4 consists of a pulley 24 which is spline connected to the driving sleeve 15. The pulley 24 is maintained in position on the driving sleeve 15 by a nut 25 and a retainer 26.

As shown in FIGURE 1, the pulley 24 and the sleeve 15 upon which it is mounted encompass the spindle shaft 4 but are slightly spaced therefrom. The driving sleeve 15 extends around a portion of the length of the spindle 4 and is spline connected to connector means in the form of a driven sleeve 29 which extends into the driving sleeve 15. Also, as shown in FIGURES 1 and 3, the driven sleeve 29 does not engage the spindle shaft 4, although the sleeve 29 encompasses the spindle shaft 4.

The driving force of the pulley 24 extends through the driving sleeve 15 and is transmitted through the splined connection to the driven sleeve 29. The driven sleeve 29 has integral therewith a pinion gear or transfer gear 30 on its outer periphery. The pinion gear or transfer gear 30 is engageable with a gear 31 carried by a back shaft or alternate shaft 32.

The back shaft 32 is disposed substantially parallel with the spindle shaft 4. In addition to the gear 31 the back shaft 32 carries a gear 28. The back shaft 32 is rotatably supported by a bearing assembly 37 and a bearing assembly 38, disposed at opposite ends thereof.

The driven sleeve 29 is provided with an annular peripheral groove 35 for a purpose discussed below. The driven sleeve 29 has a bell portion 27 at the right hand end thereof. Within the bell portion 27 are a plurality of inwardly directed teeth 33. With proper axial positioning of the sleeve 29 and the bell portion 27 thereof, the teeth 33 mesh with teeth 34 of a gear 92 which is fixedly attached to the spindle shaft 4. The gear 92 also has teeth 94 which are in meshed engagement with any suitable gear means (not shown) for synchronizing other lathe operations with rotation of the spindle 4.

A transfer gear 39 is splined to the spindle shaft 4 and is axially movable thereupon. The gear 39 may be axially moved into meshed engagement with the gear 28 of the back shaft 32. The gear 39 is axially movable upon the spindle shaft 4. The gear 39 is provided with an annular peripheral groove 42.

Adjacent the gear 39 and slightly to the right thereof, as shown in FIGURES 1 and 3, is a fixed tooth or toothed means 41 which is rigidly secured to the support structure 1.

A speed selector mechanism 40, shown particularly in FIGURE 2, includes a fixed rod 46 carried by the support structure 1. The rod 46 is provided with an axially extending recess 48 for reception of a rack 49 which is axially movable therein. The rack 49 is provided with a toothed portion 50.

A selector gear 51 is supported by a selector shaft 58 which is rotatably carried by the support structure 1. A selector knob 59 is attached to the shaft 58 for rotation thereof. Upon rotation of the selector knob 59 the selector gear 51 rotates and causes the rack 49 to move axially.

The rack 49 carries finger members 36 and 43 which are fixedly attached thereto by clamps 54 and 55. The finger member 36 has an end slidably disposed within the annular groove 35 of the bell portion 27 of the sleeve 29. The finger member 43 has an end slidably disposed within the annular groove 42 of the gear 39. Thus, with rotation of the knob 59, the gear 51 moves the rack 49 which causes the fingers 36 and 43 to axially simultaneously move the sleeve 29 and the gear 39.

As shown in FIGURE 4, the selector knob 59 is formed with a knurled portion 60 to provide good frictional contact with an operator's hand. Five positions are indicated on the knob 59. This includes three positive positions and two neutral positions. The seelctor knob 59 has a Low position 72, a Neutral position 74, a Hi position 76, a Neutral position 78, and a Spindle Lock position 80. The selector knob 59 is rotatable so that any one of the positions 72, 74, 76, 78, or 80, may be aligned with an indicator mark 84, shown in FIGURE 2.

When the selector knob 59 is rotated in aligning the Low position 72 with the indicator mark 84, the rack 49 travels axially so that the finger member 36 moves the sleeve 29 toward the left, as shown in FIGURES 1 and 3. The rack 49 is moved toward the left to such an extent that the pinion gear 30 of the sleeve 29 comes into meshed engagement with the gear 31 of the back shaft 32, as shown in dotted lines "A" in FIGURE 1. Also, with this movement of the rack 49, the finger 43 moves the gear member 39 axially upon the spindle shaft 4 to a position in which the gear member 39 is in meshed relation with the gear member 28 of the back shaft 32, as shown in dotted lines "A" in FIGURE 1.

As set forth above, the driving sleeve 15 rotates with rotation of the pulley 24. Due to the fact that the driving sleeve 15 is splined to the driven sleeve 29, the gear 30 of the driven sleeve 29 causes rotation of the gear 31 of the back shaft 32. The gear 28 of the back shaft 32 rotates with rotation of the back shaft 32, causing rotation of the gear member 39 which is splined to the spindle shaft 4. Therefore, the spindle shaft 4 is driven through the back shaft 32 when the Low position 72 of the selector knob 59 is positioned in alignment with the indicator mark 84.

Due to the fact that the Neutral position 74 is immediately adjacent the Low position 72 of the indicator knob 59, slight rotative movement of the indicator knob 59 counterclockwise moves the indicator knob 59 so that the Neutral position 74 is in alignment with the indicator mark 84. When this occurs, the finger members 36 and 43 move the driven sleeve 29 and the gear member 39 toward the right as shown in FIGURES 1 and 3. Thus, the gear 30 of the sleeve 29 and the gear member 39 are positioned as shown in solid lines in FIGURE 1. Thus, in the Neutral position 74, both of the gear members 30 and 39 are out of engagement with any other gear and there is no driving connection between the pulley 24 and the spindle shaft 4. Thus, even though the pulley 24 rotates and causes rotation of the driving sleeve 15 and the driven sleeve 29 there is no rotation of the spindle shaft 4.

Due to the fact that the Hi position 76 of the selector knob 59 is adjacent the Neutral position 74, slight rotative counterclockwise movement of the selector knob 59 from the Neutral position 74 moves the Hi position 76 into alignment with the indicator mark 84. When this occurs, the finger members 36 and 43 travel farther toward the right, as shown in FIGURES 1 and 3. Such movement toward the right of the finger members 36 and 43 in obtaining the Hi position 76, causes the finger 36 to move the bell portion 27 of the sleeve 29 so that the inwardly directed internal teeth 33 come into meshed relation with the teeth 34 of the fixed gear 92, as shown in solid lines in FIGURE 3. Due to the fact that the gear 92 is rigidly secured to the spindle shaft 4, the spindle shaft 4 thus rotates directly with rotation of the pulley 24 and at the same rate of rotation as the pulley 24.

Slight rotational movement of the selector knob 59 in a counterclockwise direction from the Hi position 76, moves the Neutral position 78 into alignment with the indicator mark 84 and causes further movement of the sleeve 29 and the gear 39 toward the right. In moving to such Neutral position 78, the bell portion 27 moves farther over the gear 92 so that the teeth 33 are moved out of mesh with the teeth 34 of the gear 92, as shown in dotted lines "B" in FIGURE 3. As this movement of the bell portion 27 occurs, the gear member 39 is moved farther toward the right but remains out of engagement with any other gear member, as shown by dotted lines "B" in FIGURE 3. Thus, there is no positive connection to the spindle 4 when the selector knob 59 is in Neutral position 78.

Further rotative movement of the selector knob 59 in a counterclockwise direction causes the Spindle Lock position 80 to come into alignment with the indicator mark 84 as the finger members 36 and 43 move the sleeve member 29 and the gear member 39, respectively, farther toward the right. When such movement of the finger members 36 and 43 occurs, the bell portion 27 moves farther over the gear member 92 but remains out of engagement with the gear member 92, as shown in dotted lines C in FIGURE 3. Also, in the Spindle Lock position 80, the gear member 39 is moved into meshed engagement with the tooth or the fixed toothed means 41, as shown in dotted lines C in FIGURE 3. Thus, the spindle shaft 4 cannot rotate. Thus, the spindle shaft 4 is locked against rotation so that auxiliary apparatus can be attached to or detached from the spindle shaft 4.

Thus, it is understood that the apparatus of this invention provides means by which a spindle shaft can be driven directly or through a back gear arrangement in such a manner that the driving means does not affect the alignment of the spindle shaft. Furthermore, the apparatus of this invention provides means by which it is possible to move from any positive driving or locked spindle position to a neutral position with only slight rotative movement of a single selector knob. Thus, a neutral position is readily and quickly available from any positive drive or locked condition of the spindle shaft.

Furthermore, the apparatus of this invention is such that a spindle lock condition cannot be obtained without first placing the spindle in a neutral or free condition.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. Apparatus of the character described comprising in combination, support means, driving means rotatably mounted on said support means, spindle means rotatably mounted on said support means and coaxial with respect to said driving means, bearing means providing a rotating support mounted concentrically between said driving means and said spindle means, an axially movable connector member rotatably encompassing said spindle means and attached to said driving means for rotation therewith, engagement means attached to the spindle means for rotation therewith, means for adjusting said connector member for engagement with said engagement means to provide a direct drive from said driving means to said spindle means, alternate transmission means having an axis of rotation parallel with the axis of rotation of said spindle means, first transfer means, the first transfer means being carried by the axially movable connector member, and second transfer means, the second transfer means being carried by the spindle means and rotatable therewith, the first and second transfer means being axially movable into and out of engagement with said alternate transmission means, said first and second transfer means thus connecting and disconnecting the alternate transmission means with respect to said spindle means and with respect to said driving means.

2. Headstock apparatus comprising support structure, driving means rotatably mounted on said support structure, a spindle shaft rotatably mounted on said support structure and extending coaxially within said driving means, bearing means rotatably connecting the spindle shaft to the driving means, an axially adjustable connector member attached to said driving means and encompassing said spindle shaft, an engagement member firmly secured to the spindle shaft, gear means slidably mounted on said spindle shaft for rotation therewith, alternate transmission means carried by the support structure and including means for coupling with the connector means and with said gear means, selector means connected to the connector means and to the gear means for movement of the connector means and the gear means into and out of coupling relation with the alternate transmission means so that the alternate transmission means is operable only when the connector means and the gear means are in coupling relationship therewith.

3. Headstock apparatus comprising support means, tubular driving means rotatably mounted on said support means, a spindle shaft rotatably mounted on said support member and extending axially within said driving means, bearing means rotatably connecting said driving means to said spindle shaft, a sleeve slidably spline connected to said driving means and encompassing said spindle, a pinion gear carried by said slidable sleeve, an annular internal gear also carried by said slidable sleeve, a first gear, the first gear being firmly connected to said spindle for rotation therewith and engageable by said internal gear, a second gear, the second gear being slidably spline connected to said spindle, an auxiliary shaft rotatably carried by said support member, gear means carried by the auxiliary shaft for engagement with said pinion and with said slidable gear, tooth means carried by the support structure and engageable by said second gear to secure the spindle against rotation, selector means carried by the support structure and movable along a line parallel with the axis of said spindle, said selector means including means engaging said sleeve and said second gear for movement thereof, rotatable manually operable control means connected to the selector means for operation thereof.

4. Apparatus of the character described comprising in combination, support means, tubular driving means rotatably mounted on said support means, a spindle rotatably mounted on said support member and extending within said driving means, bearing means positioned within the driving means and engaging the spindle forming a rotatable mounting for said spindle for rotation relative to said driving means, a slidable sleeve spline connected to said driving means, a pinion gear formed integral with said slidable sleeve, a ring gear formed integral with said slidable sleeve, a spindle gear firmly attached to said spindle for rotation therewith, a connector gear slidably spline connected to said spindle, a shaft rotatably carried by said support means on an axis parallel to the axis of said spindle, first gear means on said shaft for meshed engagement with said pinion on said slidable sleeve upon proper axial movement thereof, second gear means on said shaft for engagement with said connector gear upon proper axial movement thereof, selector means mounted on said support member and slidable along a line parallel with the axis of said spindle, said selector means including a member engaging said connector gear for movement thereof, the selector means also including a member engaging said sleeve for movement thereof.

5. In a machine tool, work apparatus including a rotatable drive pulley, a spindle shaft coaxial with the drive pulley and rotatable with respect thereto, a drive member connected to the drive pulley and rotatable therewith, a connector gear member attached to the drive member for rotation therewith, the connector gear member being axially movable with respect to the drive member, an auxiliary shaft parallel to the spindle shaft, a first gear and a second gear attached to the auxiliary shaft and rotatable therewith, the connector gear being axially movable into meshed relation with the first gear, a slide gear attached to the spindle shaft for rotation therewith but axially movable with respect to the spindle shaft, the slide gear being axially movable into meshed engagement with the second gear, a driven gear attached to the spindle shaft for rotation therewith, the connector gear being movable into meshed engagement with the driven gear, fixed tooth means attached to the support structure, the slide gear being movable into meshed relation with the fixed tooth means, and means for axial movement of the connector gear and the slide gear.

6. In a machine tool, a spindle shaft, a drive pulley encompassing the spindle shaft but rotatably mounted with respect thereto, a back shaft rotatably mounted on an axis substantially parallel to the spindle shaft, first and second gear means attached to the back shaft for rotation therewith, an axially movable connector member encompassing the spindle shaft, means attaching the connector member to the drive pulley for rotation therewith, first and second gear means attached to the spindle shaft for rotation therewith, first and second gear means attached to said connector member for rotation therewith, the connector member being movable for meshed engagement of the first gear means of the connector member with the first gear means of the back shaft, the connector member also being movable for meshed engagement between the second gear means thereof and the first gear means of the spindle shaft, the second gear means of the spindle shaft being movable for meshed engagement with the second gear means of the back shaft, fixedly positioned toothed means adjacent the second gear of the spindle shaft, the second gear means of the spindle shaft being movable into meshed engagement with said toothed means, the connector member and the second gear means of the spindle shaft being movable to a plurality of neutral positions, there being a neutral position adjacent each meshed engagement position, and selector means connected to the connector member and to the second gear means of the spindle shaft for axial movement thereof into the meshed engagement positions thereof and into the neutral positions thereof.

7. In a machine tool, a spindle shaft, a drive pulley encompassing the spindle shaft but rotatably mounted with respect thereto, a back shaft rotatably mounted on an axis substantially parallel to the spindle shaft, first and second gear means attached to the back shaft for rotation therewith, an axially movable connector member encompassing the spindle shaft, means attaching the connector member to the drive pulley for rotation therewith, first and second gear means attached to the spindle shaft for rotation therewith, first and second gear means attached to said connector member for rotation therewith, the connector member being movable for meshed engagement of the first gear means of the connector member with the first gear means of the back shaft, the connector member also being movable for meshed engagement between the second gear means thereof and the first gear means of the spindle shaft, the second gear means of the spindle shaft being movable for meshed engagement with the second gear means of the back shaft, fixedly positioned toothed means adjacent the second gear of the spindle shaft, the second gear means of the spindle shaft being movable into meshed engagement with said toothed means, the connector member and the second gear means of the spindle shaft being movable to a plurality of neutral positions, there being a neutral position adjacent each meshed engagement position, selector means connected to the connector member, the selector means including a pair of finger members, there being one finger member engaging the connector member and the other finger member engaging the second gear means of the spindle shaft, rack means attached to the finger members in supporting relation thereto, a pinion gear in meshed relation with the rack, and a rotatable hand knob connected to the pinion gear.

8. In a machine tool, a spindle shaft, a first gear and a second gear attached to the spindle shaft for rotation therewith, axially movable drive gear means, a back shaft provided with a first gear and a second gear, the drive gear means being axially movable into meshed engagement with the first gear of the back shaft, the drive gear means also being axially movable into meshed engagement with the first gear of the spindle shaft, the second gear of the spindle shaft being axially movable into meshed engagement with the second gear of the back shaft, and selector means coupled to the drive gear means and to the second gear of the spindle shaft for axial movement thereof.

9. In a machine tool, a rotatable spindle shaft, a drive pulley rotatably mounted with respect to the spindle shaft and coaxial therewith, an axially adjustable connector gear coaxial with the spindle shaft, means connecting the connector gear to the drive pulley for rotation therewith, the connector gear including a pinion portion and a bell portion, there being annular internal teeth within the bell portion, a first driven gear fixedly attached to the spindle shaft for rotation therewith, the connector gear being axially movable so that the bell portion encompasses the first driven gear with the teeth of the bell portion in meshed engagement with the first driven gear, the connector gear also being axially movable so that the bell portion encompasses the first driven gear with the teeth of the bell portion out of engagement with the first driven gear, a back shaft adjacent the spindle shaft, first and second gear members carried by the back shaft, a second driven gear attached to the spindle shaft for rotation therewith, the second driven gear being axially movable upon the spindle shaft, the second driven gear being axially movable into meshed engagement with the second gear of the back shaft, the connector gear being movable so that the pinion portion thereof is in meshed engagement with the first gear of the back shaft, means for axial movement of the connector gear and the second driven gear of the spindle shaft.

References Cited in the file of this patent

UNITED STATES PATENTS

| | | |
|---|---|---|
| 1,947,829 | Cole | Feb. 20, 1934 |
| 2,408,658 | Kurzweil | Oct. 1, 1946 |
| 2,773,395 | Reibig | Dec. 11, 1956 |
| 2,866,348 | Pettigrew | Dec. 30, 1958 |
| 3,036,479 | Aquillon et al. | May 29, 1962 |